(No Model.)
J. EUTSLER.
SAW JOINTER.
No. 304,631. Patented Sept. 2, 1884.
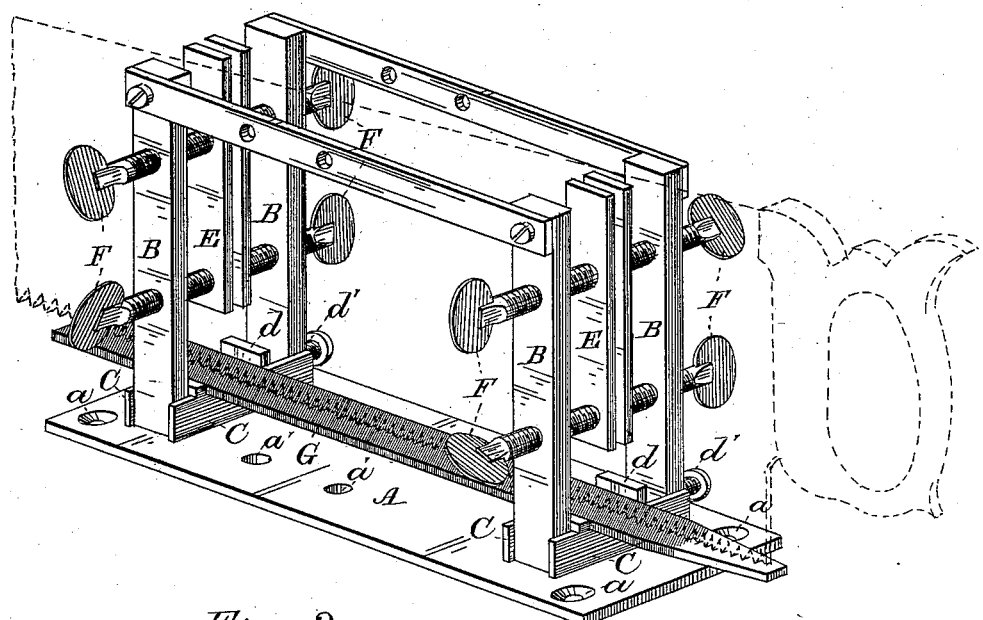
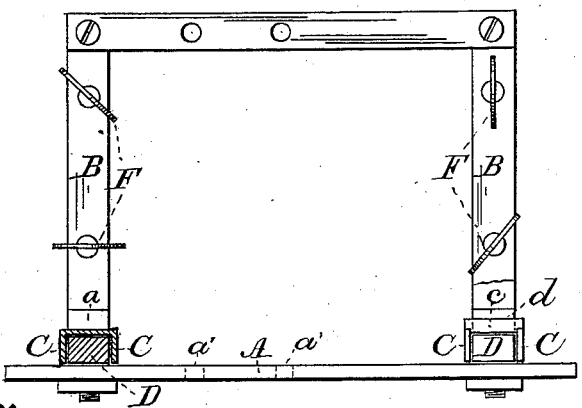
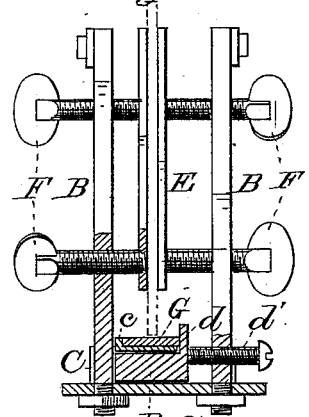
Witnesses,
Geo. H. Strong.
Inventor,
John Eutsler
Dewey & Co.
Attorneys

UNITED STATES PATENT OFFICE.

JOHN EUTSLER, OF WALLACE, CALIFORNIA.

SAW-JOINTER.

SPECIFICATION forming part of Letters Patent No. 304,631, dated September 2, 1884.

Application filed March 5, 1884. (No model.)

*To all whom it may concern:*

Be it known that I, JOHN EUTSLER, of Wallace, county of Calaveras and State of California, have invented an Improvement in Saw-Jointers; and I hereby declare the following to be a full, clear, and exact description thereof.

My invention relates to a new and useful machine which I call a "saw-jointer," the object of which is to put in line the cutting-edges of the wedge-shaped points of the teeth of a saw to make it run true; and it consists in a frame having an adjustable clamping device for securing the file and adjustable plates or bars for receiving and guiding the saw over the file, as I shall hereinafter fully explain.

Referring to the accompanying drawings, Figure 1 is a perspective view of my saw-jointer. Fig. 2 is an elevation, the lower portion of the two nearest standards being cut away, showing the jaws C and sliding piece D between two of the standards in transverse section, and the corresponding jaws (C) and sliding piece D between the other standards in elevation. Fig. 3 is an end elevation and part section.

A is a base-plate, provided with corner holes, $a$, whereby it may be screwed to a block or table, or to a vise.

B are four uprights or standards, secured to the plate A by having their ends formed into bolts, and passing through the plate, taking nuts below, by means of which they may be tightened down. Between each pair of these standards at the ends are the clamping devices for the file. These consist of the spaced plates C, lying on each side of the standards and having the cross-jaws $c$ inside of and bearing against the standards on one side, and the pieces D, sliding between the plates C, and having the jaws $d$, against which the screws $d'$ impinge, whereby said jaws may be adjusted toward jaws $c$.

E are four guide plates or bars between and parallel with the standards. These are in pairs, and are supported by the thumb-screws F through the standards, and by which they are also adjusted to or from each other and to or from the standards.

G is the file. This is laid flat on the clamps and is secured between the jaws by tightening up the screws $d'$.

The saw is to be placed between the upright guide plates or bars E, with its teeth resting upon the file, and the bars may then be adjusted to guide the saw blade or plate accurately as it is reciprocated over the file, whereby the cutting-edges of its teeth are filed down into line.

In this device any size of file may be used, and by proper adjustment of the guide-bars E the saw may be moved to operate over any portion of the file. For some saws (circular saws, for example,) a short file might be used. To provide for this, I have the series of holes $a'$ nearer together. The standards may be set up and secured in these, and as short a file as necessary used.

Having thus described my invention, what I claim as new, and desire to secure by Letters Patent, is—

1. In a machine for lining the cutting-edges of the teeth of saws, a horizontal file and the jaws $c$ and $d$, for clamping or securing it firmly, in combination with guides E above the file, in which the saw blade or plate is directed while its teeth are reciprocated over the file, substantially as described.

2. In a machine for lining the cutting-edges of the teeth of saws, a horizontal file and jaws $c$ and $d$, for clamping it firmly, in combination with spaced guides above the file, for receiving and directing the saw, and thumb-screws for adjusting said guides toward or from each other and sidewise, to confine the saw-blade and move it, when desirable, over a fresh portion of the file, substantially as described.

3. In a machine for lining the cutting-edges of the teeth of saws, the standards B, the file G between them, and jaws $c$ and $d$, for clamping it, in combination with the guide-bars E between the standards, and their supporting and adjusting screws F, substantially as herein described.

4. In a machine for lining the cutting-edges of the teeth of saws, the base-plate A, standards B, guide-bars E, and supporting and adjusting-screws F, in combination with the file G and the means for clamping it, consisting of the spaced plates C, having jaws c, the sliding pieces D, having jaws d, and the adjusting-screws d', all arranged and operating substantially as herein described.

5. In a machine for lining the cutting-edges of the teeth of saws, the base-plate A and the removable and adjustable standards B, in combination with the file G and the jaws for clamping, and the guide-bars E and screws F for adjusting, said bars, substantially as herein described.

In witness whereof I have hereunto set my hand.

JOHN his X mark EUTSLER.

Witnesses:
  A. L. LEVINSKY,
  JAS. S. LOUTTIT.